United States Patent [19]

Ludlow

[11] Patent Number: 5,195,503

[45] Date of Patent: Mar. 23, 1993

[54] SOLAR COLLECTOR

[76] Inventor: Gilbert T. Ludlow, R.R. #1, Barrie/Ontario, Canada, L4M 4Y8

[21] Appl. No.: 709,332

[22] Filed: Jun. 3, 1991

[51] Int. Cl.⁵ ............................................. F24J 2/18
[52] U.S. Cl. .................................. 126/600; 126/628; 126/617; 126/586; 126/685
[58] Field of Search ............... 126/451, 439, 438, 430, 126/428, 432, 435, 437, 425, 424; 359/592, 593

[56] References Cited

U.S. PATENT DOCUMENTS

| | | |
|---|---|---|
| 4,059,226 | 11/1977 | Atkinson . |
| 4,068,474 | 1/1978 | Dimitroff ........................ 126/439 X |
| 4,286,581 | 9/1981 | Atkinson, Jr. ....................... 126/439 |
| 4,286,581 | 1/1981 | Atkinson, Jr. . |
| 4,295,462 | 10/1981 | Bunch . |
| 4,340,031 | 7/1982 | Niedermeyer . |
| 4,373,514 | 2/1983 | Lois ................................. 126/439 X |
| 4,394,860 | 7/1983 | Smith .............................. 126/451 X |
| 4,402,306 | 9/1983 | McElroy, Jr. .................... 126/439 X |
| 4,696,285 | 9/1987 | Zwach . |
| 4,841,946 | 6/1989 | Marks ................................ 126/451 |

Primary Examiner—Larry Jones

[57] ABSTRACT

A solar collector for use in association with a building, the system having a concave mirror located on the exterior of the building and defining a focal point, a moveable mounting for moving the mirror to aim it directly at the sun at least over a predetermined period of the daylight hours, a secondary reflector located at the focal point of the concave mirror to receive the sun's rays reflected from the mirror means, an opening in the concave mirror to receive a concentrated beam of the sun's rays reflected from the secondary reflector, a third reflector located on the convex side of the concave mirror to receive the concentrated beam of the sun's rays from the secondary reflector reflected through the opening, and to redirect it along a heat storage path, a support connected to the concave mirror to receive the redirected beam, the support passing from the exterior to the interior of the building, an energy conversion system within the building interior to receive the redirected light beam from the mirror and to convert it into useable heat, and, a storage system within the building for storing heat.

14 Claims, 6 Drawing Sheets

SOLAR COLLECTOR

FIELD OF THE INVENTION

The invention relates to solar collectors, and in particular to collectors for collecting solar energy in the form of light, and for transmission as a concentrated light beam into the interior of an insulated building.

BACKGROUND OF THE INVENTION

Solar energy appears to be the single most attractive source of energy. Solar systems are not liable to wind damage, as is the case with wind energy systems. They can be installed almost anywhere, unlike tidal energy which must be located in coastal areas. Solar energy systems consume no fuel and the energy is, therefore, fuel and is, therefore, "free", in a sense. It causes no emissions to pollute the environment. It does not appear to require complex transmission and delivery systems such as electrical power lines, gas or oil pipe lines, or other delivery systems, provided it can be collected "on site", i.e., where it is to be used.

Solar energy has however one major disadvantage, namely, that it is available only intermittently, in the hours of daylight. Accordingly, it is obvious that sufficient solar energy must be collected during the hours of daylight, that a sufficient quantity of energy can be stored, for reuse during the hours of darkness when it is not available. Clearly, systems could be engineered to carry out these functions on a very large scale. However, that would then require the collection and storage of large quantities of solar energy which would then have to be transmitted from place to place, for example, to a large number of homes, connected to a central solar collector. This would result in excessive capital costs, and would likely result in relatively high energy transmission losses. Clearly, such centralized systems would fail to take advantage of the principal significant fact concerning solar energy, namely, in that it is substantially universally available over a large portion of the face of the earth, and thus does not require special transmission systems, to transmit the energy from one place to another. The theoretically ideal solar energy system would be self-contained, so that individual systems could be provided for individual buildings or homes, so that each building or home could be essentially energy self-sufficient. In this way, complex transmission or generation systems would not be required.

It is however apparent that in the design of any solar energy collector system it will be necessary to collect solar energy falling on a relatively substantial surface area, to provide sufficient energy even for a single home or building. In order to achieve this, numerous proposals have been made for providing solar collectors based on some form of concave curved mirror usually of parabolic shape having a relatively large surface area. The mirror catches the sun's rays falling on all points of the mirror, and concentrates them into a single point, resulting in a high energy concentration of light at that point. Usually, at the focal point of the mirror, a secondary reflector is provided for reflecting the concentrated point of light, and redirecting it, so as to convert the energy of the concentrated light beam into some other form of energy. Typical proposals of this general type are shown in, for example, U.S. Pat. Nos. 4,286,581, 4,295,462, 4,340,031, and 4,696,285. It is, of course, implicit in any of these solar collector devices that the actual mirror itself must be located in the open air. In all of these proposals, the mirror concentrates the solar energy falling on the mirror at the focal point of the mirror. The concentrated light is re-directed into a portion of the collector where the energy of the light beam is then converted into heat. For example, in U.S. Pat. No. 4,286,581, the solar energy is utilized to heat a tubular chamber, or cavity, and a fluid medium is passed through the chamber or cavity, and absorbs the heat from the concentrated light rays. The energy in the fluid is then transported to some other location for use. It is, of course, implicit in any of these proposals that the mirror must be mounted on a suitable tracking mount, so that the mirror can always be pointed directly at the sun. This is a necessary and essential feature, since unless the mirror is pointed exactly at the sun, the sun's rays when reflected by the mirror will not be received on the secondary reflector and will thus not be concentrated into the light beam but will simply be reradiated into the atmosphere. Accordingly, in the proposals of the type described above, it is usually necessary for the entire apparatus consisting of the mirror, the secondary reflector, and also the heat conversion chamber, all to be mounted together and moved simultaneously to track the path of the sun. Such systems therefore require highly complex suspension and transmission mechanisms, to provide the facility for accurate tracking of the sun, by all of the the components simultaneously.

Other proposals for collecting solar energy have been made of a more simplistic nature, for example as shown in U.S. Pat. No. 4,059,226. In this type of proposal, large chambers are filled with any suitable heat storage medium. In this case, the medium is simply rock or stone. The chambers are fixed in position, and have glass panels through which the sun's rays may pass and heat up the stones. In the particular example, of this patent, insulating panels are adapted to be swung down over the glass panels, when the heat generated by the sun's rays falls below a certain preset minimum temperature.

Systems of this kind are relatively massive installations, and are suitable in only relatively limited "sun belt" portions of the globe, and must obviously be located for optimum operation in a fixed location, i.e., facing south in the Northern hemisphere.

Another proposal is shown in U.S. Pat. No. 3,988,166. In this patent, a concave mirror is provided, mounted on a suitable tracking mount, and having a secondary light concentration mirror at the focal point. The light falling from the main mirror on the secondary mirror is concentrated into a light beam. A central opening in the main mirror allows this concentrated light beam to pass through the main mirror. An energy collection chamber is provided immediately behind the main mirror, for receiving energy from the concentrated light beam. The converted energy is then transmitted from this chamber, to a location where it may be of use. While this system is somewhat simpler to construct, it still has the disadvantage that the energy conversion takes place out of doors, and requires the transmission of an energy conversion medium, typically, for example, a fluid medium, from the solar collector itself into the building or facility where the energy is required, typically to heat the building or to provide hot water for a domestic hot water system. Thus thick insulation must be provided to limit heat losses in transmission.

BRIEF SUMMARY OF THE INVENTION

With a view to overcoming the various problems noted above, the invention comprises a solar collector for use in association with a building, defining an exterior and interior, and said system comprising generally concave collector mirror means having front and rear sides and being adapted to be located on the exterior to receive the rays of the sun and defining a focal point, and being moveable whereby to aim the same directly at the sun, at least over a predetermined period of daylight hours, secondary reflector means located on said front side with a common focal point with said collector mirror means whereby to receive the sun's rays reflected from said collector mirror means, opening means located in said collector mirror means substantially along a central axis thereof and adapted to receive a concentrated beam of the sun's rays reflected from said secondary reflector means, third reflector means located on the rear side of said collector mirror means and oriented to receive said concentrated beam of the sun's rays from said secondary reflector means reflected through said opening means, and to redirect the same along a heat storage path, support means connected to said collector mirror means and adapted to receive said redirected beam, said support means being adapted to pass from the exterior to the interior of a said building, energy conversion means within said building interior adapted to receive said redirected light beam from said collector mirror means and to convert the same into useable heat, and, storage means within said building for storing said useable heat converted from said concentrated light beam.

The invention further comprises such a solar collector system wherein said support means includes conduit means, defining a hollow interior located on a substantially vertical axis, said collector mirror means being adapted to move in a plane transverse to said column means around said vertical axis, and wherein said third reflector means is adapted to direct said light beam along and within said conduit means.

The invention further provides such a solar collector system wherein said third reflector means concludes a moveable reflector moveable on an axis transverse to said vertical axis of said column means, and wherein said collector mirror means is also moveable on an axis transverse to said column means, movement of said moveable reflector being coordinated with movement of said collector mirror means, whereby to maintain said light beam along a path, passing along said conduit means, but without contacting the same.

The invention further comprises such a solar collector system wherein said support means includes a mirror holder of hollow construction fixedly connected to the rear side of said collector mirror means, a stub sleeve rotatably coupled to the free end of said mirror holder, and a hollow column member connected to the free end of said stub sleeve, and hinge means connecting the same for angular movement of said stub sleeve relative to said column, and motor means for moving the same.

The invention further comprises such a solar collector and wherein said mirror holder comprises two sleeve portions, joined together at a right angle to form a generally L-shaped structure, and wherein said third reflector means includes a reflector member at said L-shaped corner, whereby to reflect light from said secondary reflector means, around said corner.

The invention further comprises such a solar collector system and wherein said third reflector means further includes a moveable reflector member mounted at said hinged junction between said stub sleeve and said column portion, whereby to reflect said light beam from said stub sleeve down said column member.

The invention further provides such a solar collector system wherein the light beam from said column member is directed into a fluid container means, to vapourize fluid contained therein, said container means being adapted to withstand substantial internal pressures, and utility means connected to said fluid container means, whereby to receive converted energy therefrom.

The invention further comprises such a solar collector system, and wherein said fluid container means supports a light receiving body adapted to receive said light, and to develop heat therefrom for dissipation in said fluid in said container means.

The invention further comprises such a solar collector system and wherein said fluid in said fluid container means is adapted to be vapourized by said heat from said body, and heat exchange means for exchanging heat therefrom to ambient air within said building.

The invention further comprises a solar collector system of the type described, and further incorporating a closed circuit domestic water system within said building, and fluid-to-fluid to heat exchange means circulating in communication with said heated fluid from said fluid container means, whereby to transfer heat therefrom to said domestic water supply.

The invention further comprises such a solar collector system and further incorporating electrical generator means operated by vapourized fluid from said fluid container means, and connected to said means for moving said collector mirror means, whereby to recycle energy therefrom.

The invention further comprises such a solar collector system and further incorporating a heat responsive heat exchange circuit for cooling the ambient air within said building, and heat circulation means connected between said fluid container means and said heat exchange means whereby to provide energy therefor.

The invention further comprises a method of collecting solar energy and comprising the steps of directing a collector mirror along a predetermined path, said mirror defining a focal point, whereby the sun's rays fall upon said mirror and reflect, and causing the reflected sun's rays to converge at said focal point of said collector mirror, reflecting said converging sun's rays from a secondary reflector with a common focal point, whereby to generate the same into an intensified beam of light, directing said beam of light through opening means along said central axis of said concave mirror on to a third reflector means for redirecting said beam of light, conducting said redirected beam of light into an insulated building interior, converting the energy of said beam of light into heat energy within said building interior, and utilizing the same, and, continuously moving said collector mirror whereby to maintain said axis directed constantly at the sun, at least during a predetermined period of the daylight hours.

The invention further comprises such a method, wherein said collector mirror is moved around a vertical axis, and around a generally horizontal axis, whereby to continuously track the position of the sun, at least during a predetermined period of the daylight hours, and wherein said third reflector means is also moveable, about a vertical plane, and about a transverse plane, in co-ordination with movement of said collector mirror, whereby to maintain said redirected beam of light on a predetermined fixed pathway.

The invention further comprises the step of converting said light beam into heat energy, by impinging said light beam on heating body means in contact with a fluid medium within said building interior, whereby to heat said fluid medium and vapourize the same.

The invention further comprises the steps of utilizing said vapourized fluid medium to provide heat for utility purposes within said building.

The invention further comprises the further step of storing heat from said fluid medium in a fluid storage container, for reuse in said building.

The various features of novelty which characterize the invention are pointed out with particularity in the claims annexed to and forming a part of this disclosure. For a better understanding of the invention, its operating advantages and specific objects attained by it use, reference should be had to the accompanying drawings and descriptive matter in which there are illustrated and described preferred embodiments of the invention.

DESCRIPTION OF A SPECIFIC EMBODIMENT

As already explained above, the invention relates principally to a solar collector system of the type which is adapted to be associated with, or installed above a building, typically a domestic dwelling. Obviously however depending upon the capacity and engineering of the system, it could be adapted to provide solar heating for larger buildings. In essence, the invention seeks to provide a solar collector system which may be located so closely associated with a building that there is no requirement for extended energy transmission systems. This, in turn, will both reduce heat losses in the system and, therefore, increase its efficiency, and at the same time reduce the overall capital cost. The freedom from the requirement for transmission systems will reduce the energy requirements demanded from outside energy utility generation systems, and this will, in turn, reduce the need for continually increasing capital expenditures on large scale utility systems, most of which result in environmental damage of one kind or another, and in addition, require the erection of unsightly and costly transmission systems of one kind or another. In terms of the individual buildings, the solar collectors in accordance with the invention will have an appearance which, in many ways, is similar to that of television satellite signal collector systems. Such systems appear to be in wide use in many residential and rural neighborhoods without any apparent significant degree of objection.

Figure 1:
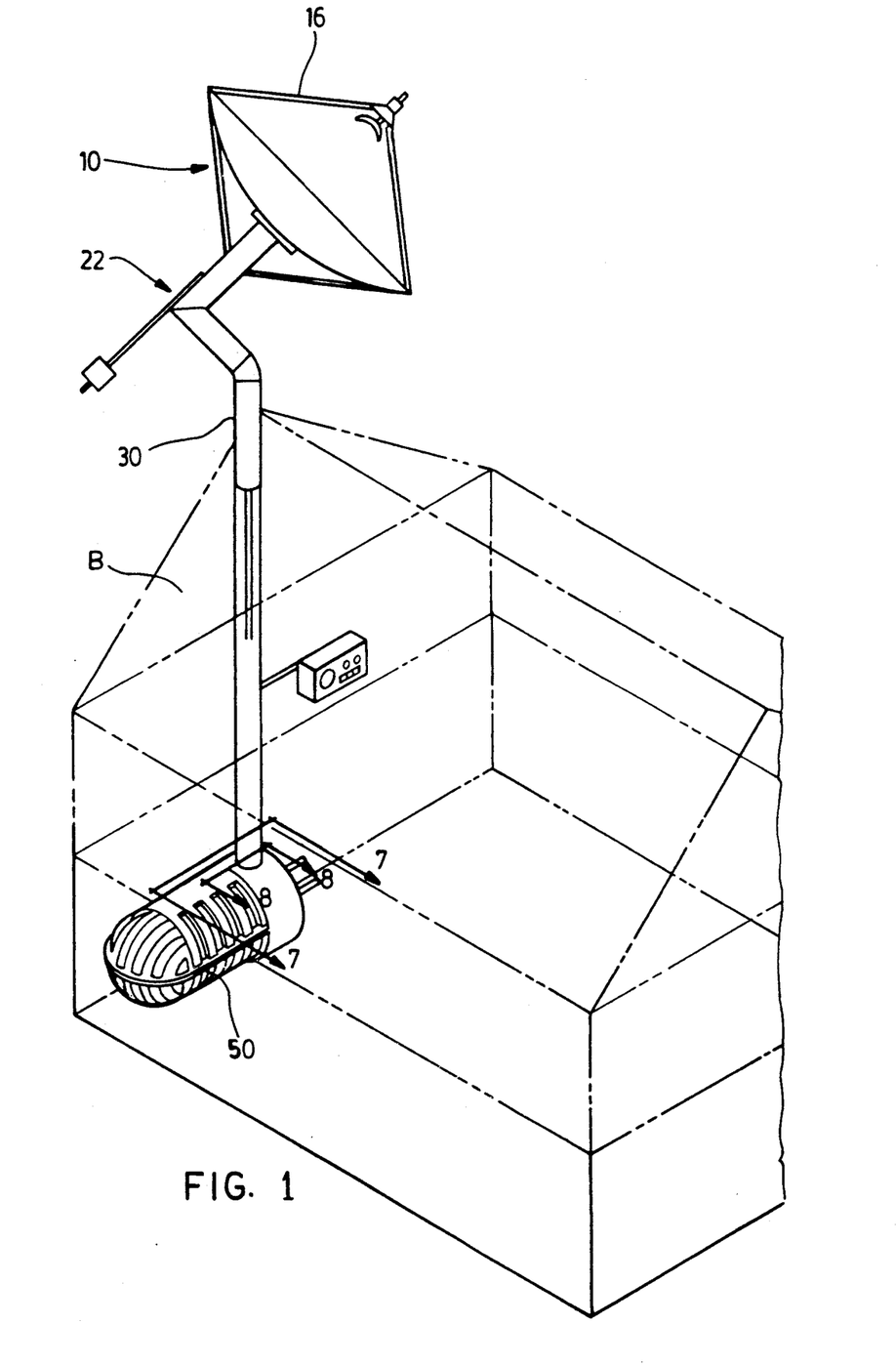
FIG. 1 is a perspective illustration of a solar collector in accordance with the invention, shown in association with a typical domestic building.

Referring first of all to FIG. 1, such a building is indicated as the general reference B, and has walls W in a roof R. In the particular case illustrated, the building B represents a domestic dwelling, although obviously it could be any one of a wide variety of different buildings. It defines an interior space enclosed within the building, and outside the building is the open air. Normally buildings will incorporate a thermal insulation within their exterior walls and roof, adequate for the location of the building on the earth's surface and the climatic and environmental conditions. Such insulation is omitted from the actual drawings since it is obviously well known, and requires no special description. Obviously, such insulation may either be insulation to prevent heat loss from the building, during the colder months, or, in hotter climates, may be insulation to reduce the heat gain in the interior of the building, from the ambient temperature of the surrounding exterior.

For the present purposes, it is not necessary to make a distinction between the two, since the invention is directed to the collection of solar energy, which energy may be used either for heating a building, or for providing energy for cooling the building.

As illustrated in FIG. 1, the solar collector system comprises a concave collector mirror 10, mounted on a moveable mounting system 12. The mounting system 12 is shown passing into the interior of the building, and the details will be explained as the present description proceeds.

The concave mirror 10 is similar to concave mirrors used in other solar collector systems, that is to say, it will typically be a parabolic mirror, defining a predetermined focal point F. The focal point F is located along the central axis A of the mirror. It is a basic law of optics in relation to such mirrors that when parallel rays of light fall upon such mirror, along axes parallel to such central axis, that they are all reflected back to the focal point. Thus provided the central axis of such a parabolic mirror is directed directly at the sun, the sun's rays falling on the surface of the mirror will all be reflected back to the focal point. This will thus produce a highly concentrated point of light energy at the focal point.

As explained, the features so far described are essentially commonplace, and necessary, to the design of any solar collector employing a concave collector mirror. Typically, a secondary reflector or mirror 14 will also be provided, being usually a concave mirror of a relatively small size located with its focal point coincident with the focal point F of the concave collector mirror 10. The secondary mirror 14 receiving the light reflected from all points on the concave mirror 10, is so shaped and designed that it will then re-reflect all of the light beams along an essentially linear axis. In the design of known solar collectors this beam is then directed at some form of energy conversion means adjacent the collector mirror.

Figures 2, 3, 4:
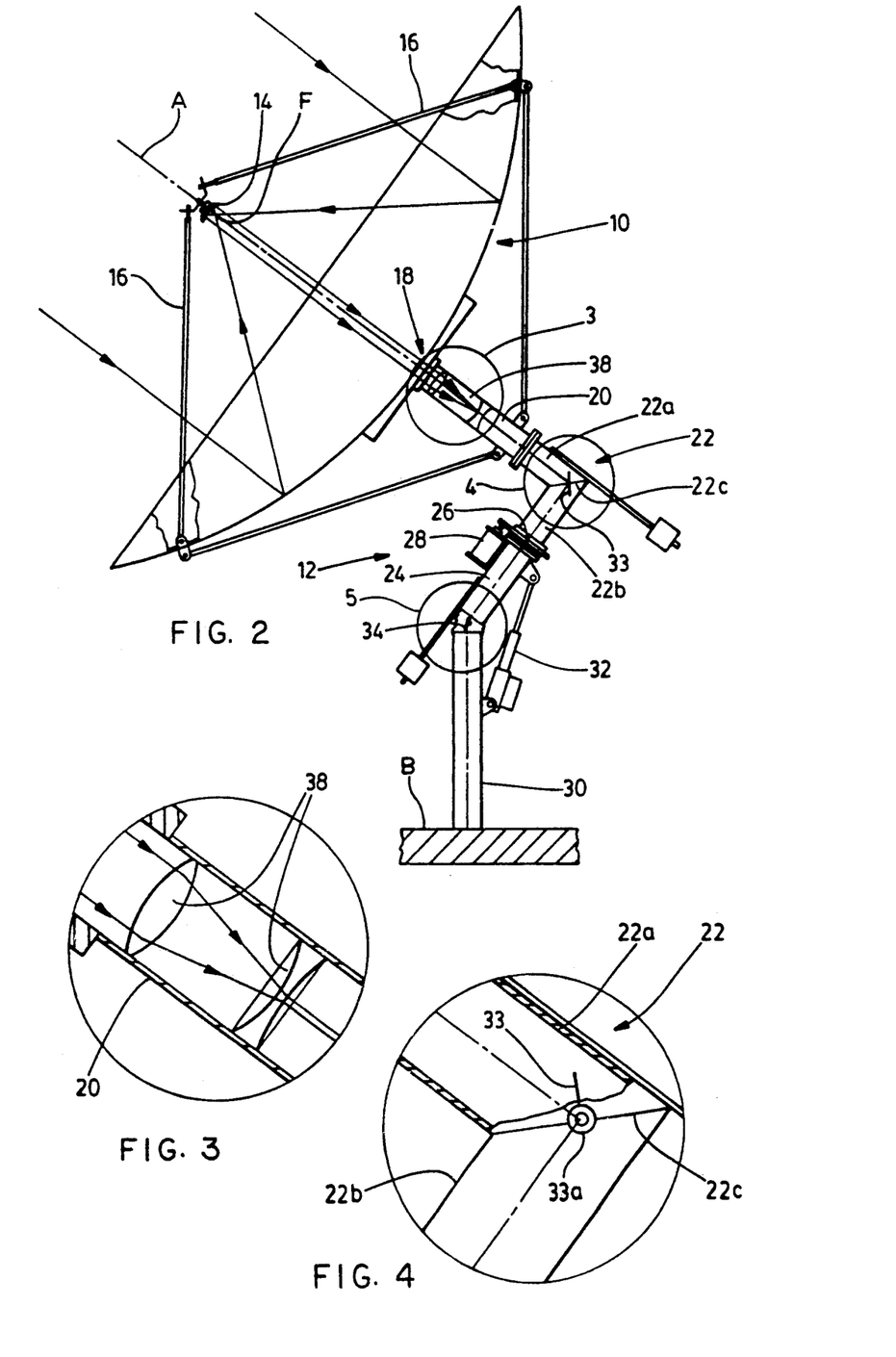
FIG. 2 is an enlarged side elevational view of the mirror portion and its mounting system partly in section.
FIG. 3 is an enlarged section of the detail in circle 3 of FIG. 2.
FIG. 4 is a section along the circle 4 of FIG. 2.
Figures 5, 6:
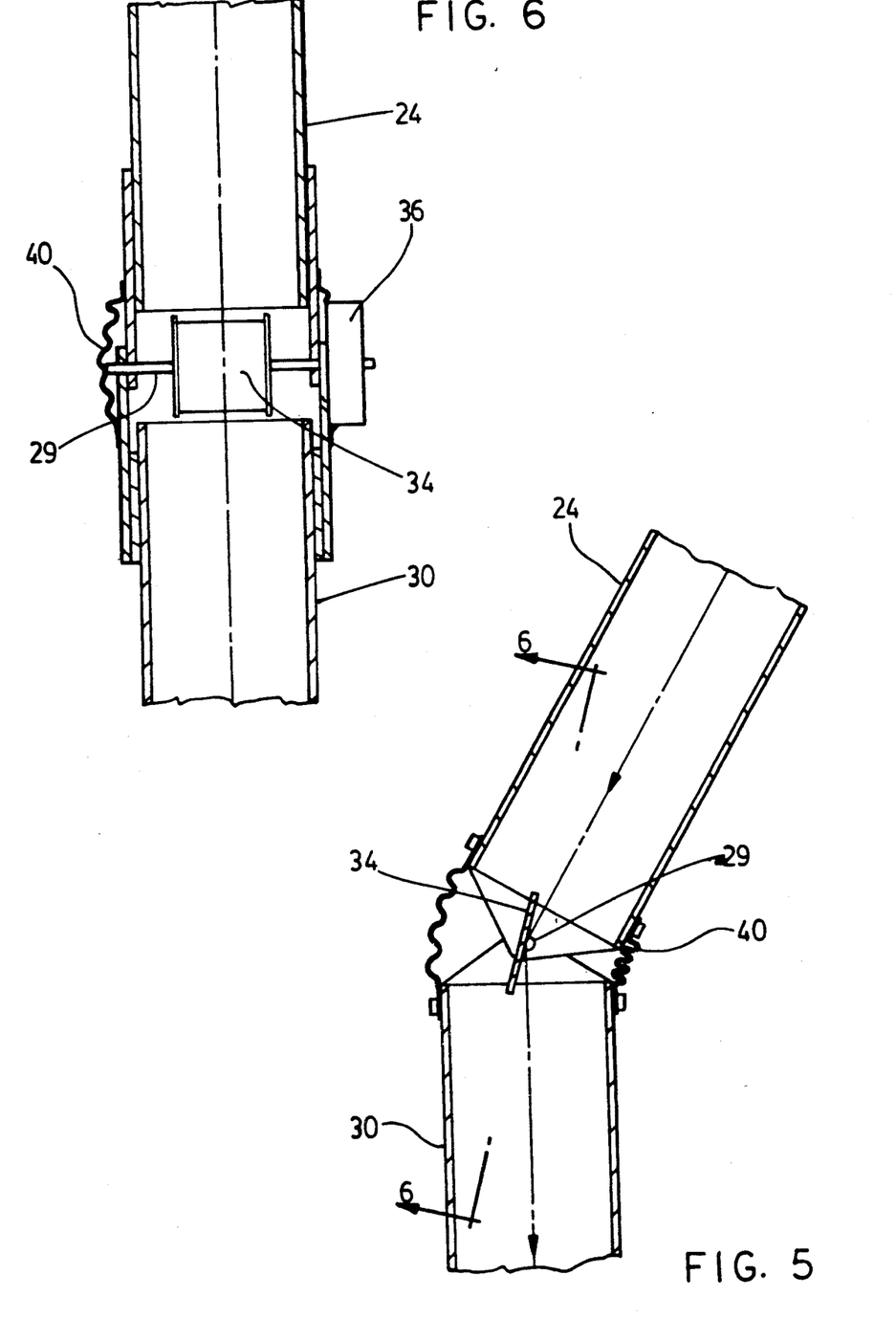
FIG. 5 is a section along the line 5—5 of FIG. 2.
FIG. 6 is a section along the line 6—6 of FIG. 5.

In the present invention, the concave collector mirror 10, having a focal point F, is provided with its secondary concave mirror 14, mounted on any suitable system of adjustable support arms 16, having its focal point coincedent with the focal point F of the concave collector mirror 10. The concave collector mirror is provided with a central axial opening 18, and the secondary concave mirror 14 is shaped and located and adjusted in such a way as to direct a concentrated beam of the sun's rays from collector 10 through opening 18.

In accordance with the invention, the concave collector mirror is mounted on a fixed support sleeve 20. Sleeve 20 is in fact a hollow tubular conduit, defining a hollow interior, the axis of which is aligned with the central axis of the concave collector mirror. Thus a light beam re-reflected by the secondary mirror 14, will pass through the opening 18 and be directed centrally along the axis of the hollow mirror support 20.

Mirror support 20 has a connecting corner 22, having a first portion 22a and an angle tube portion 22b meeting at a right angular corner 22c. The angle tube portion is, in turn, rotatably coupled to a hollow stub sleeve 24, by means of a rotatable coupling 26. A motor drive 28 drives the angle tube portion 22B in a rotary motion relative to stub sleeve 24.

Stub sleeve 24 is hingedly mounted as at 29 to a fixed column conduit 30. Conduit 30 extends downwardly into the insulated interior of a building b. Any suitable movement means such as the electrical rotary screw 32 provides for tilting movement of support conduit 24 relative to column 30.

A third reflector means comprises a fixed mirror 33, at corner 22c, and a fourth reflector means comprising moveable mirror 34, located along the central axis of column 30, at hinge 29.

As best shown in FIG. 4, mirror 34 is driven by means of a 2 to 1 gear train 36, so that as stub sleeve 24 moves one degree mirror 34 will move one-half degree and so on. This enables the collector mirror to be adjusted to correspond to changes in the declination angle of the sun.

Preferably, in order to control the beam of light coming from the secondary mirror 14, a lens system 38 is provided in support 20, to focus the beam into a narrower central beam, such that it may pass down the conduits 20, 22, 24, and 30, without contacting the sides.

It will thus be seen that by means of the rotary mount 26 and motor 28 and hinged mount 9, and rotary screw 32, the concave collector mirror 10 can be effectively aimed directly at the sun both as to azimuth angle and as to declination angle, and track the sun over a predetermined period of the daylight hours.

It will also be observed that in all positions of the sun during which the mirror is tracking the sun, the concentrated beam of the sun's rays created by the mirrors 10 and 14, and the lens 38, and the third reflector means, namely the fixed mirror 33, and the fourth mirror means namely moveable mirror 34, the beam of sun's rays is directed centrally within the interior of conduit means 30, which thus conducts the light beam from the exterior to the interior of building B.

As will be seen from FIG. 3, a protective flexible boot of suitable ribbed material such as rubber or synthetic material indicated generally as 40 may be provided around the hinged joint 29, and any suitable protective means (not shown) may also be provided around the rotary coupling 26, so as to make the entire conduit weatherproof.

As mentioned above, once the light beam has been guided into the insulated interior of the building, it is then used for conversion into a more useful form of energy.

For this purpose, the energy conversion apparatus is described now with reference to FIGS. 7, 8, 9 and 10.

Figure 7:
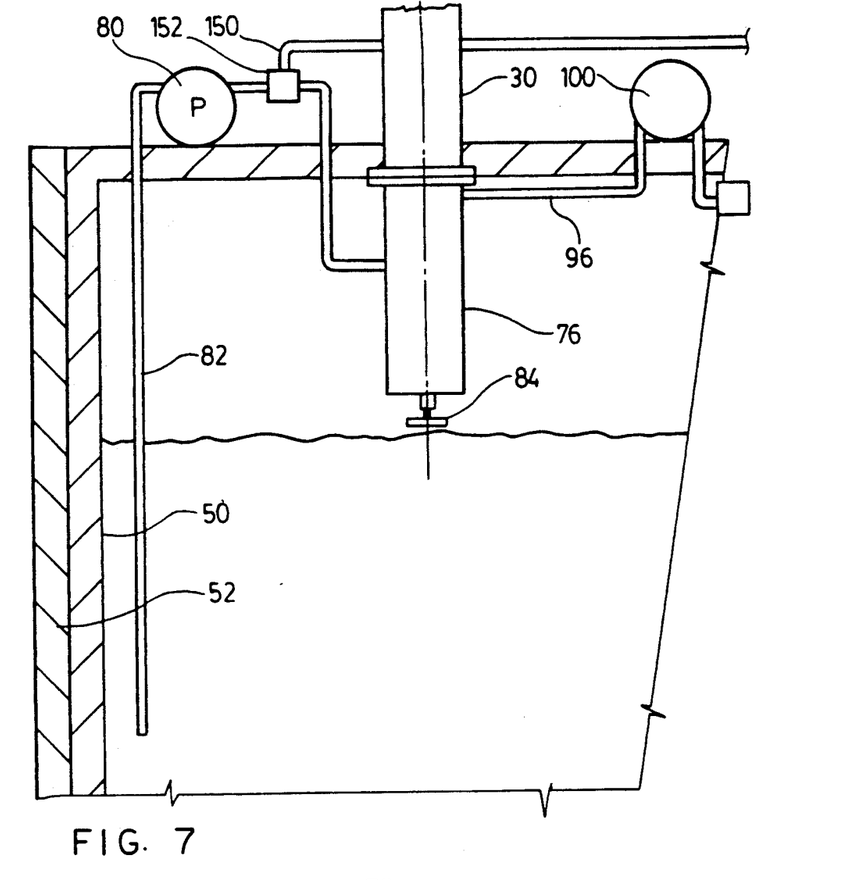
FIG. 7 is a partial section along the line 7—7 of FIG. 1.
Figure 8:
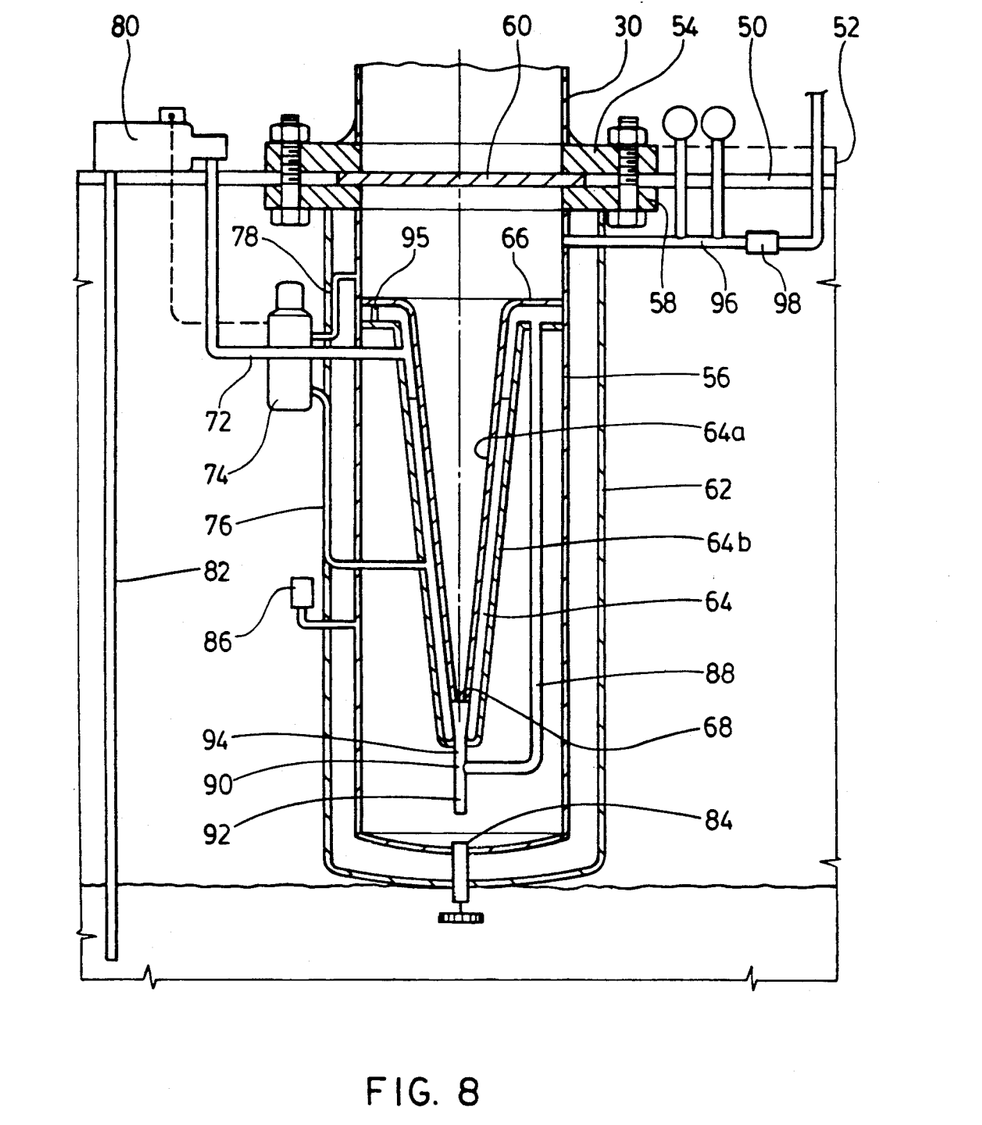
FIG. 8 is an enlarged section along the line 8—8 of FIG. 1.
Figure 9:
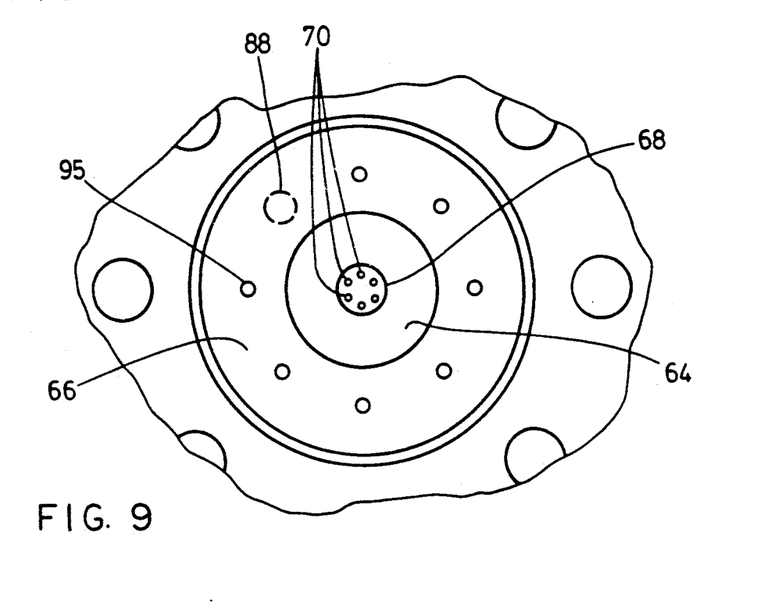
FIG. 9 is an enlarged section along the line 9—9 of FIG. 8.

As shown in FIGS. 7 and 8, the lower end of the column 30 is seen after passing through the insulated exterior of the building B. At its lower end, the column 30 is secured on the outer side of a thermal storage vessel indicated generally as 50. Vessel 50 is preferably insulated as at 52, and as shown in this embodiment, may be of a horizontal cylindrical shape, although any other suitable shape may be provided engineered to store a substantial quantity of liquid, and withstand the hydrostatic forces involved. The design of such hydrostatic storage vessels is well known in the art and requires no special description, the showing of a cylindrical vessel here being merely for the sake of simplicity and without any limitation.

Flange 54 is located on the lower end of column 30, and is bolted to the upper surface of tank 50.

Within tank 50 and in registration with the lower end of column 30, is a generally cylindrical pressure vessel 56, having at its upper end a flange 58. Flange 58 is bolted through the wall of vessel 50 to flange 54 of column 30.

A thick plate of pressure and heat resistant or light permeable material glass indicated as 60 is sandwiched between the two flanges 56 and 58.

The pressure vessel 56 has an outer jacket 62, spaced from the inner vessel 56, and it defines an air space for insulation of the pressure vessel 56 from the storage vessel 50.

Within pressure vessel 56, there is located a generally frusto-conical shaped boiler tube 64, secured at its upper end by a transverse flange 66, securing it within vessel 56. The frusto-conical tube 64 and flange 66 are in fact a hollow structure defining interior and exterior walls 64a and 64b, and it is adapted to be at least partially filled with fluid, in this case, water.

At its lower end, there is a metallic plate 68 (FIG. 9) secured, and plate 68 is provided with a plurality of small passageways 70 therethrough for reasons to be described below.

In order to introduce water into the frusto-conical boiler tube 64, a water inlet pipe 72 supplies water, through a level-sensing valve 74. Valve 74 is connected by means of a lower pipe 76 to the boiler tube 64, and by an upper pipe 78 to the interior of pressure vessel 56.

In this way, by sensing the differential pressures within the boiler tube 64 and the vessel 56, the valve 74 is essentially self-operating so as to maintain a predetermined level of water within boiler tube 64.

Water is supplied to conduit 72 via a pump 80, and a water intake 82 extending downwardly to the bottom of tank 50.

Suitable drain valves and safety valve 84 and 86 are provided on the pressure vessel in accordance with the well known practice in the art.

The flange 86 of the tube 64 is also hollow, and is connected via a steam downpipe 88, to the lower end of the frusto-conical boiler tube 64. Steam downpipe 88 meets a T-junction 90, from which a water drain 92 allows drips of water to fall under the influence of gravity into the bottom of vessel 56.

A steam transfer pipe 94 connects from T-junction 90 upwardly through the lower end of boiler tube 64, to a point just underneath the plate 68. Steam can thus pass upwardly through the holes 70 in the plate 68, and can flow up through the interior of the frusto-conical boiler tube 64.

Openings 95 are formed through flange 66 to permit the steam pressure to equalize at the top and bottom of vessel 62.

It will thus be apparent that as steam is generated in the frusto-conical tube 64 itself, by boiling of the water caused by heat from the light beam, steam will flow upwardly and then pass into the flange 64, and then downwardly through pipe 88 to T-junction 90. It will then flow upwardly through supply pipe 94 through plate 68. Plate 68 will be observed to be located at the apex of the frusto-conical boiler tube 64, and centered directly on the axis of the beam of light indicated generally as L. Thus the plate 68 will, during all operating conditions, be at an extremely high temperature, and thus the steam which passes up through boiler tube 64 and exits via pipe 94 will effectively be superheated and dried, so as to recover the maximum energy from the light beam.

Live steam is then fed through the steam outlet conduit 96, through pressure valve 98.

Figure 10:
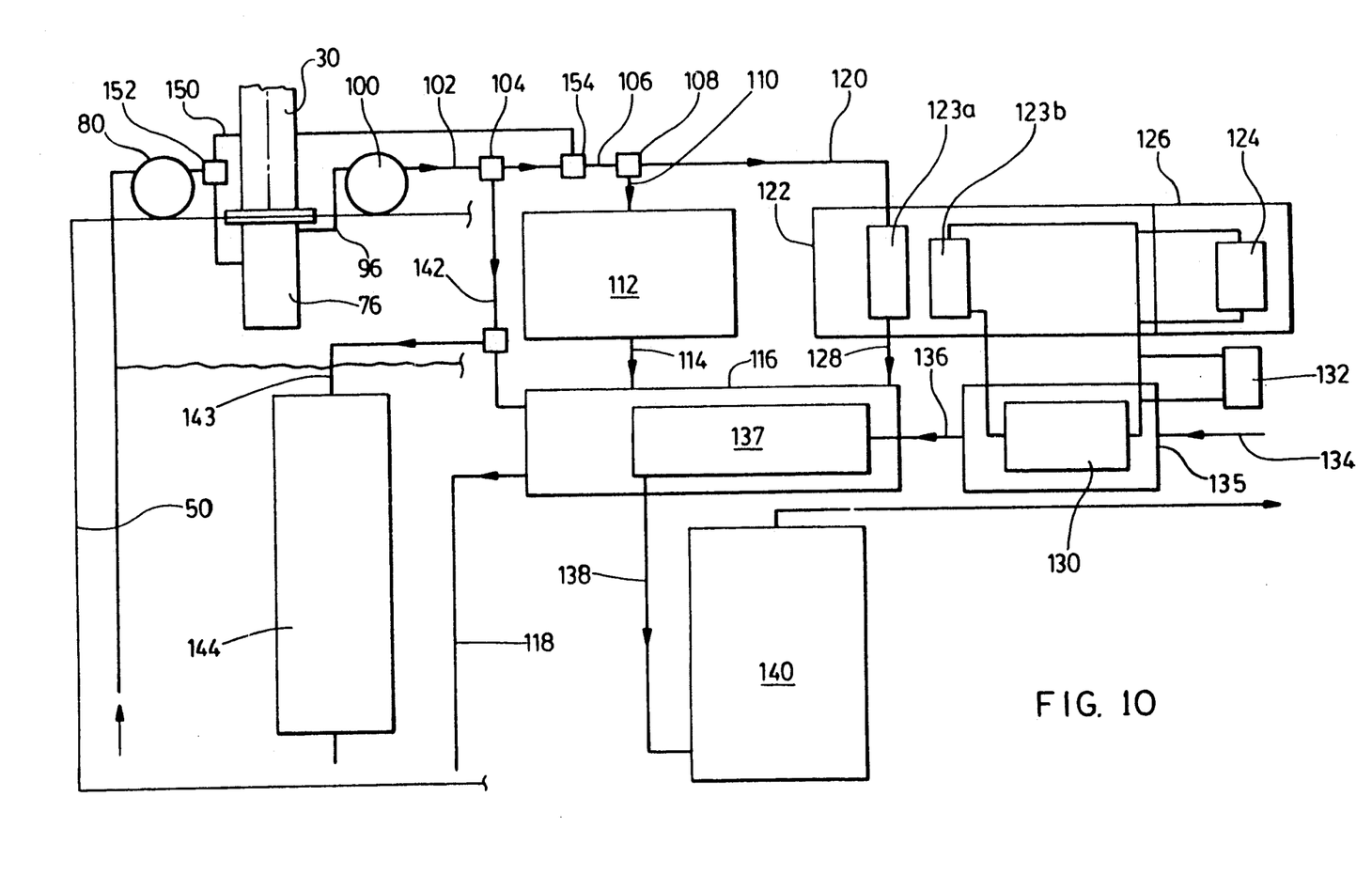
FIG. 10 is a schematic flow circuit diagram, showing the flow of heat from the solar collector, through the system in both heating and cooling modes.

As shown in FIG. 10, the live steam conduit 96 will be seen to be connected to a steam turbine driven electrical generator 100. From generator 100, steam passes along pipe 102. Pipe 102 connects with a control valve 104 which, in turn, passes to a further pipe 106. Pipe 106 connects with a control valve 108, which in turn connects with a further header pipe 110. Header pipe 110 supplies a heat exchanger-radiator 112. One or more air movers such as fans (not shown) are provided for forcing air through the heat exchanger 112. The air would be connected to the air supply duct system in the building (not shown) and would thus supply hot air, during the months requiring heating, throughout the building. The passage of the steam through the radiator 112 will substantially reduce the temperature of the steam and may condense it into hot water which is collected in the pipe 114. Header Pipe 114 supplies steam, and hot water, to a water to water heat exchanger 116, the water condensed from the steam is then returned via pipe 118 to the storage tank.

This is the mode of operation of the invention, during the seasons requiring heating.

During hot weather, requiring cooling of the building, valve 108 diverts the live steam from the line 106 through pipe 120, to an absorption-type heat exchanger 122. This may operate on a lithium bromide cycle, having a hot side 123a and a cold side 123b or an ammonia condensation and expansion cycle. Both cycles are well known in the art, and are responsive to heat input on one side, to provide a cooling effect on the other.

The heat exchanger 122 is connected to a heat collector 124 will typically be located in an air duct 126 which is part of the building air circulation system.

Some of the steam in pipe 120 will be condensed during passage through the heat exchanger 122, and water and some remaining steam will be passed to the heat exchanger 116 via pipe 128.

In addition, since the effect of the heat collector 124 of the heat exchanger will be to take up heat from the ambient air circulating in the duct 126, the heat collector 124 is connected through a waste heat recovery exchanger 30, and may also be connected through an exterior outdoor heat exchanger 132, having coupled with it a suitable fan (not shown) of a type well known in the art.

The coolant medium from exchanger 130 is returned back to the cold side 123b of heat exchanger 122.

In order to supply heating for the domestic hot water system in the building, the domestic water supply 134 is connected via a chamber 135 enclosing the waste heat recovery exchanger 130, through pipe 136 to a heat collector 137 the heat exchanger 116. In the heat collector 137, the domestic water is then heated and is passed by pipe 138 to a domestic hot water storage tank 140 of a type well known in the art.

During intermediate seasons, when neither heating nor cooling of the building are required, a bypass pipe at 142 connects valve 104 with the domestic water heat exchanger 116, and also, through an alternate bypass pipe 143, to a heat exchanger and steam condenser 144 located in the storage chamber.

In this way, the system is capable of operating at all seasons of the year. Clearly, at least at intermediate seasons of the year, if a pre-determined domestic hot water temperature is reached, and a pre-determined temperature is reached in the water in the storage chamber, then further heating is superfluous. At this point, the generator 100 will be shut down by suitable controls so that the solar collector mirror is no longer directed at the sun. Within a very few minutes of the generator 100 shutting off, the sun's rays will no longer be focused in the manner described above, and heat collection from the sun's rays will be discontinued.

Thus the system is essentially self-regulating at all seasons of the year. It is essentially a matter of engineering to ensure that the various heat exchange cycles are capable of handling the heating and/or cooling load required in the building, and the storage chamber is sufficiently large to supply storage over any extended periods of an absence of sunlight.

During any extended period of absence of sunlight, then a bypass pipe 150, connected through valves 152 and 154, will simply permit the pump 80 to draw hot water directly from the storage chamber, and pass it around the system.

Obviously, the engineering of the system will depend upon its location on the earth's surface, the average number of hours sunlight in winter and summer, and the size of the building to be heated. Consequently, the hot water storage vessel 50 and the engineering of the system may vary depending upon the requirements of the particular building at a particular location.

While in this description, reference has been made to reflector means, for reflecting a beam of light in a predetermined manner. It will of course be appreciated that in certain circumstances, other means can be substituted for actual mirrors. Thus for example fibre optic means may be used in place of the mirrors, where such fibre optic means are designed for carrying the sun's rays. Thus wherever used herein secondary reflector means and like language is intended to incorporate both mirrors and other means transmitting light i.e. fibre optics and the like.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A solar collector system for use in association with a building defining an interior and an exterior, for collecting heat from the sun throughout a predetermined period of each day and responsive to track both the azimuth angle and the declination angle of the path of the sun each day and said system comprising:

generally concave collector mirror means adapted to be located exteriorly of said building and to receive the rays of the sun, and direct the same as a concentrated beam at a focal point;

secondary reflector means having a focal point located co-incident with said focal point of said collector mirror means whereby to receive the sun's rays reflected from said concave collector mirror means, and reflect same as a concentrated beam of rays along the central axis of said collector mirror means;

opening means located in said collector mirror means substantially along said central axis thereof and adapted to receive said concentrated beam of rays reflected from said secondary reflector means;

mounting tube means connected to said collector mirror means and extending along said central axis rearwardly thereof;

angle tube means connected to said mounting tube means at right angles thereto and being moveable whereby to in turn move said mounting tube means and said collector mirror means continuously over said predetermined period whereby to maintain said collector mirror means aimed directly at the sun through said period;

third reflector means located rearwardly of said collector mirror means in said angle tube means and oriented to receive said concentrated beam of rays at 45 degrees thereto from said secondary reflector means through said opening means, and to redirect the same along said angle tube means;

support column means connected to said angle tube means by swingable connection means;

adjustment means operable to adjust the angle of said angle tube means whereby in turn to adjust the declination angle of said collector mirror means whereby to maintain the same in accordance with variations in the declination angle of the sun;

fourth reflector means at the junction between said angle tube means and said support column means and adapted to receive said redirected beam, said support column means being adapted to transmit said beam from the exterior to the interior of a said building;

energy conversion means within said building interior adapted to receive said redirected light beam from said concave mirror means and to convert the same into useable heat, and, storage means within said building for storing said useable heat converted from said concentrated beam of rays.

2. A solar collector system as claimed in claim 1 wherein said support column means includes conduit means, defining a hollow interior located on a substantially vertical axis, and wherein said fourth mirror means is adapted to direct said beam of rays along and within said conduit means.

3. A solar collector system as claimed in claim 1 wherein said fourth mirror means is moveable on an axis transverse to said vertical axis of said support column means, and movement control means for said fourth mirror means whereby the same is co-ordinated with movement of said collector mirror means, whereby to maintain said light beam along a path, passing along said support column means, but without contacting the same.

4. A solar collector system as claimed in claim 1 wherein said beam of rays from said support column is directed into a fluid container means, said container means being adapted to withstand substantial internal pressures, and utility means connected to said fluid container, whereby to receive converted energy therefrom.

5. A solar collector system as claimed in claim 4, wherein said fluid container means supports a light receiving body, adapted to receive said beam of rays, and to develop heat therefrom for dissipation in said fluid in the said container means.

6. A solar collector system as claimed in claim 5, wherein said fluid in said fluid container means is adapted to be vapourized by said heat from said body, and heat exchange means for exchanging heat therefrom to ambient air within said building.

7. A solar collector system as claimed in claim 1, and further incorporating a closed circuit domestic water system within said building, and fluid-to-fluid to heat exchange means circulating in communication with said heated fluid from said fluid container means, whereby to transfer heat therefrom to said domestic water supply.

8. A solar collector system as claimed in claim 1 further incorporating electrical generator means operated by heat energy from said fluid container means, and connected to said means for moving said collector mirror means, whereby to recycle energy therefrom.

9. A solar collector system as claimed in claim 1 and further incorporating a heat responsive heat exchange circuit for cooling the ambient air within said building, and heat circulation means connected between said fluid container means and said heat exchange means whereby to provide energy therefor.

10. A method of collecting solar energy and comprising the steps of;

directing a generally concave collector mirror having a central opening on a mounting column secured in registration along a predetermined path, said mirror defining a focal point and a central axis said mirror being movable about an azimuth arc and a declination arc, whereby the sun's rays fall upon said mirror over a predetermined period of the path of the sun and reflect same at said focal point thereby causing said reflected rays to converge at said focal point of said collector mirror;

reflecting said rays from a secondary mirror at said focal point of said collector mirror whereby to generate the same into an intensified beam of rays along said central axis;

directing said intensified beam through said opening means along said and along said mounting column on to third mirror means, said third mirror means being mounted at the junction between said mounting column, and an angle tube, said mounting column being secured at a right angle to said angle tube, and thereby redirecting said beam of rays along a predetermined path enclosed by said angle tube;

directing said beam from said third mirror means onto fourth mirror means mounted at the junction between said angle tube and a vertical support column, said angle tube being swingably connected to said support column and said fourth mirror means being swingably mounted at said junction and thereby conducting said redirected beam into a building interior;

converting energy from said beam into heat energy within said building interior, and utilizing the same, and, moving said collector mirror both as to azimuth angle. and declination angle whereby to maintain said axis directed constantly at the sun, at least during a predetermined period of the daylight hours.

11. A method, as claimed in claim 10, wherein said collector mirror is moved around an angled axis, and around a generally horizontal axis, whereby to continuously track the position of the sun, at least during a predetermined period of the daylight hours, and wherein said fourth mirror means is also moveable, about said horizontal axis, in co-ordination with movement of said collector mirror, whereby to maintain said redirected beam on a predetermined fixed pathway.

12. A method as claimed in claim 11, and including the step of converting said beam into heat energy, by impinging said beam on heating body means immersed within a fluid medium, whereby to heat said fluid medium and vapourize the same.

13. A method as claimed in claim 12, and including the step of utilizing said vapourized fluid medium to provide heat for utility purposes within the building.

14. A method as claimed in claim 13, and including the step of storing heat from said fluid medium in a fluid storage tank, for reuse in said building.

* * * * *